United States Patent Office 3,741,817
Patented June 26, 1973

---

3,741,817
PROCESS FOR PRODUCING MONOCRYSTALS FROM III–V COMPOUND MELTS WITH A BORON OXIDE RIM
Klaus Bienert, Winfried Lang, and Fritz Kremser, Burghausen-Obb., Germany, assignors to Wacker-Chemitronic Gesellschaft fur Elektronik-Grundstoffe m.b.H., Postfach, Germany
No Drawing. Filed July 6, 1970, Ser. No. 52,751
Claims priority, application Germany, July 7, 1969, P 19 34 369.2
Int. Cl. B01j *17/18;* C01b *27/00*
U.S. Cl. 148—1.6     3 Claims

ABSTRACT OF THE DISCLOSURE

A process for producing monocrystals from a melt of III–V compounds containing a component which is volatile at the melting point of the compound, which comprises achieving the stoichiometry of the III–V compound by setting the vapor pressure of the volatile component, coating the surface of the melt of said III–V compound with an area, preferably a rim, of boron oxide melt, and drawing a monocrystal from the melt.

---

It is known how to draw monocrystals of III–V compounds from the melt. One can draw from a crucible in a vertical direction as well as from a vat in a horizontal direction. The drawback of these methods resides in the fact that minute, non-melting crystals of impurities on the melt surface float to the monocrystal and disturb the monocrystalline growth. This creates grain boundaries which appear as interstratifications and twin planes. These impurities most frequently stem from the crucibles and vats used in semiconductor technology which, for instance, consist of aluminum nitride or boron nitride.

It is also known when producing monocrystals from III–V compounds with one component which is volatile at the melting point of the compound, to obtain stoichiometry of the melt by setting the vapor pressure inside the sealed drawing vessel at the value which the volatile compound has above the melt of the III–V compound at the melting temperature. This is achieved by introducing at a point in the vessel a small quantity of the pure volatile compound and by setting at the coldest point of the vessel that temperature at which the pure volatile compound has the same vapor pressure as above the melt of the III–V compound. Thereby the evaporation of the volatile component from the melt is prevented.

Another possibility of producing semiconductor monocrystals from III–V compounds is by covering the melt with a layer of boron oxide melt and thus preventing the volatile component from evaporating. This also prevents the impurities from the crucible or the vat from floating along the surface toward the growing crystal, because they are absorbed by the boron oxide melt. The drawback of this method lies in the fact that during heating, volatile impurities, particularly oxide impurities, evaporate, forming bubbles, carrying with them uncontrollable quantities of the volatile component of the III–V compound. It is not possible to later restore the stoichiometry of the III–V compound melt by means of the vapor pressure of the volatile component because the surface is covered by the boron oxide melt.

We have now discovered a process for producing monocrystals from the melt of III–V compounds which have one component which is volatile at the melting point of the compound, by drawing from a crucible or vat, where the stoichiometry of the III–V compound is achieved by setting the vapor pressure of the volatile component, and if necessary, one works in the presence of doping substances. The process is characterized by the fact that the surface of the melt of the III–V compound is surrounded by a boron oxide melt, and if necessary, other parts of the surface are covered.

In the process of the invention only part of the surface of the melt of the III–V compound is covered by molten boron oxide. It is thereby possible to adjust the stoichiometry of the III–V compound with the aid of the vapor pressure of the volatile component even after evaporation of the volatile impurities. Also, the advantages of the boron oxide layer are retained, and surprisingly even a small boron oxide rim takes up large quantities of impurities from the material of the crucible or vat.

Compared to the drawing method where the melt is completely covered, the process of the invention has the additional advantage that one can first place the non-volatile component into the crucible or vat, melt this component down, place a rim of boron oxide melt on it and then introduce the volatile component through the vapor phase up to stoichiometry. From the melt from the III–V compound obtained in this manner, the monocrystal can be drawn in accordance with known methods. Thus the process of the invention makes it possible to carry out the production of the III–V compound as well as the subsequent drawing of the monocrystal from the polycrystalline material in the same apparatus.

The invention is of particular significance in producing gallium arsenide monocrystals. But the invention has also proven useful for other III–V compounds with one volatile component, like gallium phosphide or indium arsenide.

With regard to the width of the boron oxide rim, the process is highly variable. If readily volatile doping substances are present, in the usual crucibles and vats the distance between the boron oxide melt and the growing monocrystal of 2 to 5 mm. appears particularly suitable. If one works with larger vessels, the distance can be made larger. If less volatile doping substances are present, it is advantageous to make the boron oxide edge less wide. However, it must be sufficient to be able to take up the expected quantity of surface crystals from the crucible material. In such cases the width of the boron oxide rim is in most cases 2 to 5 mm.

If the remaining free surface of the melt is small, the adjustment of the stoichiometric proportion of the III–V compound requires more time than when the free surface is larger. Also, the extent of the doping created by the oxygen of the boron oxide melt, depends on the quantity of boron oxide used.

Most suitable n-doping substances are selenium, sulphur, tellurium, silicon. Suitable for p-doping are for instance beryllium, magnesium, calcium, copper, zinc and cadmium.

The process of the invention is carried out in apparatus customarily used for the drawing of monocrystals. There is a special use for monocrystals from III–V compounds for producing lasers.

EXAMPLE 1

All tests were made in an apparatus as described in DBP No. 1,233,828.

65 g. gallium were first placed in an aluminum oxide crucible with a top width of 40 mm., bottom width 20 mm., height 40 mm. 1 g. boron oxide was placed on top of the gallium. From a supply of arsenic (about 120 g.) the proper quantity of arsenic for setting the stoichiometry of the gallium arsenide was evaporated into the gallium which had been heated to the melting point of the gallium arsenide, with the aid of a vapor pressure of about 1 atmosphere in the known manner. Then from this melt the gallium arsenide was drawn to a monocrystal with the aid of a seed, and at a drawing speed of 0.2–0.3 mm./min. Impurities can be traced in the remaining boron oxide melt in the form of small crystals or as dissolved oxides.

EXAMPLE 2

Into a boron nitride crucible with a diameter of about 35 mm. and a height of 33 mm., 140 g. of gallium arsenide doped with tellurium was placed, and then 1 g. of boron oxide was placed on it. The stoichiometry of the gallium arsenide was assured from an arsenic supply which produces a vapor pressure of about 1 atmosphere. The gallium arsenide was heated to the melting temperature (about 1240° C.) and a monocrystal was drawn from the melt with a seed (drawing speed 0.2-0.3 mm./min.).

Applying the same process, a gallium arsenide crystal doped with chromium was drawn. However, here only 0.2 g. of boron oxide was used, because chromium is hardly volatile at the melting point of gallium arsenide, and therefore a small boron oxide rim already brings the advantages of the invention.

EXAMPLE 3

In a boron nitride crucible with a diameter of about 55 mm. and a height of 40 mm., 350 g. gallium arsenide were coated with 50 mg. boron oxide. This small quantity of boron oxide is sufficient to make perfect drawing of a monocrystal possible.

What is claimed is:

1. A process of producing a monocrystal of a III-V compound including a nonvolatile component III and a volatile component V, comprising the steps of:
   (a) providing a melt of said nonvolatile component III having a temperature about the melting temperature of said III-V compound;
   (b) placing on the surface of said component III melt, a melt of boron oxide defining an outer rim;
   (c) reacting vapors of said volatile component V with said component III melt to form a molten body of III-V compound at a vapor pressure sufficient to prevent vaporization of component V therefrom and to achieve the stoichiometry of said III-V compound;
   (d) drawing a III-V monocrystal from said molten body;
   (e) the inner edge of said boron oxide rim being spaced away from the surface of said monocrystal a sufficient distance to permit access of the component V vapors to said molten body of III-V compound, and the width of said rim being sufficient to permit the boron oxide to take up and remove particles of impurities present on the surface of said molten body.

2. The process of claim 1 in which the III-V compound is gallium arsenide.

3. The process according to claim 1, in which the boron oxide rim is from 2 to 5 mm. wide and is spaced from the growing monocrystal by a distance of from 2 to 5 mm.

References Cited
UNITED STATES PATENTS

| | | | |
|---|---|---|---|
| 3,198,606 | 8/1965 | Lyons | 23—273 |
| 3,401,023 | 9/1968 | Mullin | 23—301 |
| 3,591,347 | 7/1971 | Grabmaier | 23—301 |

NORMAN YUDKOFF, Primary Examiner

R. T. FOSTER, Assistant Examiner

U.S. Cl. X.R.

23—301 SP, 300, 273 SP